Figure 3:
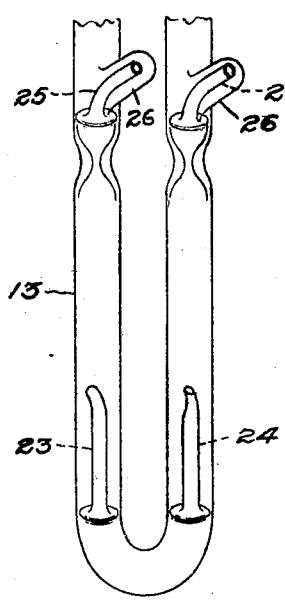

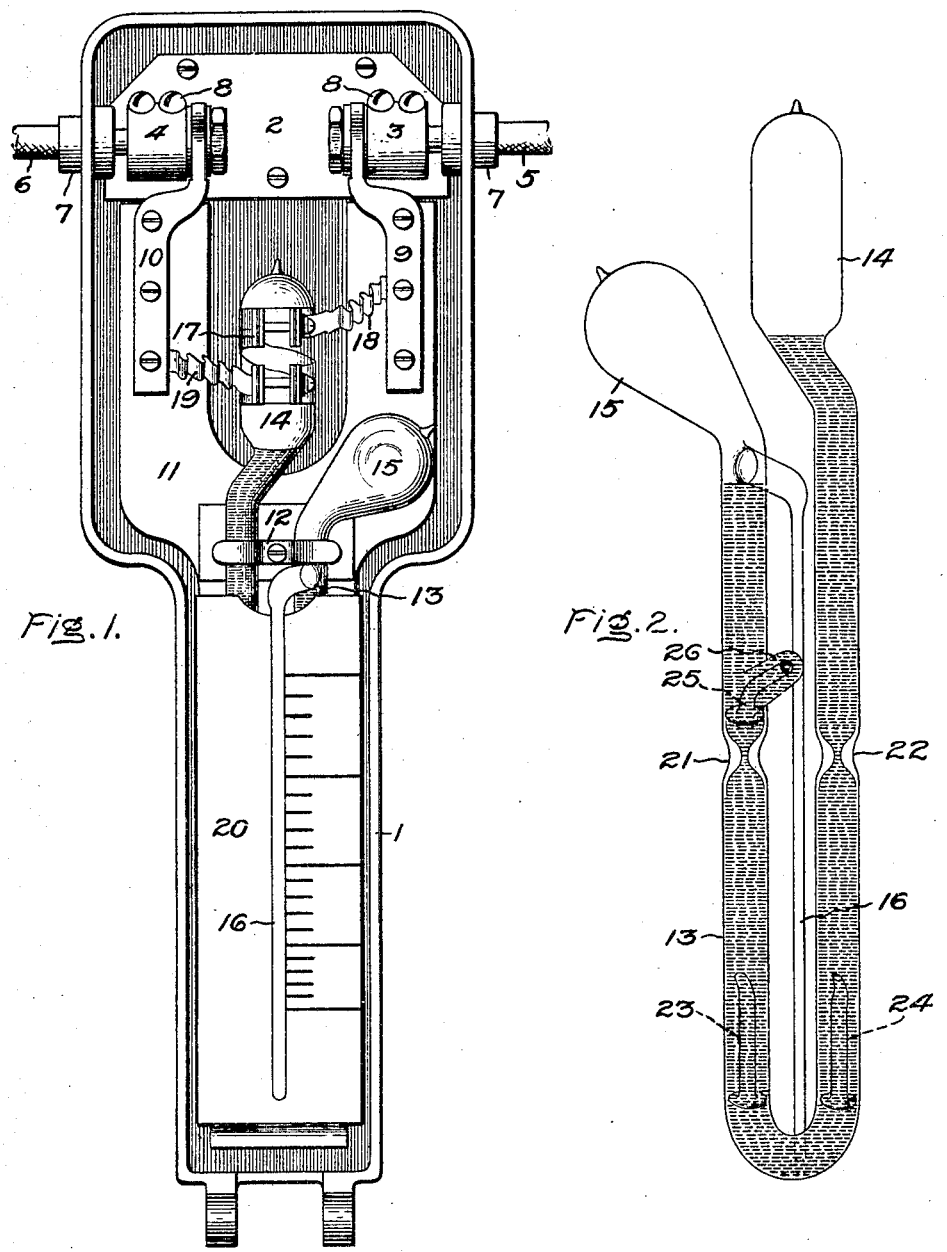

No. 856,441. PATENTED JUNE 11, 1907.
F. H. BOWMAN.
MAXIMUM DEMAND INDICATOR.
APPLICATION FILED NOV. 13, 1906.

2 SHEETS—SHEET 2.

WITNESSES:
Marcus L. Byng.
George W. Tilden.

INVENTOR:
Francis H. Bowman,
By Albert G. Davis,
Att'y.

UNITED STATES PATENT OFFICE.

FRANCIS H. BOWMAN, OF PITTSFIELD, MASSACHUSETTS, ASSIGNOR TO STANLEY-G. I. ELECTRIC MANUFACTURING COMPANY, A CORPORATION OF NEW JERSEY.

MAXIMUM-DEMAND INDICATOR.

No. 856,441.   Specification of Letters Patent.   Patented June 11, 1907.

Application filed November 13, 1906. Serial No. 343,203.

*To all whom it may concern:*

Be it known that I, FRANCIS H. BOWMAN, a citizen of the United States, residing at Pittsfield, county of Berkshire, State of Massachusetts, have invented certain new and useful Improvements in Maximum-Demand Indicators, of which the following is a specification.

My invention relates to maximum-demand indicators, and particularly to that type of indicator in which a conductor, carrying the current to be measured, heats a portion of a tube, thereby expanding the gas therein which, in expanding, causes a liquid in the tube to spill over into an adjacent receptacle beside which is a scale indicating the current that corresponds to the amount of liquid spilled over. An instrument of this kind is covered by the patent to Wright, No. 583,160, May 25, 1897. In this type of demand indicator, resetting of the instrument is accomplished by inverting the tube which contains the liquid. This causes any liquid that may have been spilled over into the gage tube to flow back into the tube in which it was originally contained and which it filled exactly to the overflowing point. This instrument in its usual form generally comprises a U-shaped tube containing a liquid and terminating at each end in a bulb, a current-carrying conductor located adjacent one of said bulbs, and a gage tube connected with one arm of the U-tube for receiving the liquid forced out of the U-tube by the expansion of the gas in the bulb to which the heating conductor is applied. With this arrangement, obviously some provision had to be made for preventing the gas in one bulb from passing over through the U-tube to the other bulb, as this would have disturbed the zero point of the instrument. This leakage of the gas from one bulb to the other would be likely to occur during transportation of the instrument or the first time the instrument was reset. In order to confine the gas in each side in its respective bulb, the constrictions, shown in Figure 13 of the patent to Wright above referred to, were placed in each arm of the U-tube. The constrictions shown in the drawings of the present application are the equivalent of these. These constrictions serve to hold back the greater part of the liquid in the U-tube when it is inverted during resetting. It was found, however, that in spite of these some bubbles were likely to escape upward into the base of the U-tube while the tube was inverted. In order to keep these bubbles from the two bulbs from mingling together and passing over to either side of the tube as chance might direct, the gas traps, shown in Fig. 14 of the Wright patent, were placed near the bottom of each arm of the U-tube. These gas traps are more clearly shown in the drawings, which are a part of this application and will be hereafter described. They serve to catch any bubbles that may rise through the constricted portions of the tube during resetting, and when the tube is turned back to its normal position allow these bubbles to rise and pass through the constrictions back into the bulbs in which they belong. That is, the bubbles will eventually rise through the constrictions into the bulbs, but this action is not always instantaneous when the tube is brought back to its normal position after resetting. This makes no particular difference on the expansion side of the instrument, but the effect on the compression side is to cause an amount of liquid, equal in volume to the bubbles below the constriction, to spill over into the gage tube, thereby giving an initial indication when there is perhaps no current passing through the instrument. If this indication is lower than the maximum indication, to be recorded before the next time for reading the instrument comes around, no harm is done. If, however, the maximum indication during this period fails to reach this point, the instrument does not give a true reading of the maximum current that has been used.

The object of my invention is to provide an improved tube which will not be open to the above-mentioned objections.

With this end in view my invention consists in applying to a tube for use in instruments of this kind, means for absolutely preventing gas from rising into the base of the U-tube during resetting of the instrument.

More particularly stated my invention consists in placing in one or both arms of the U-tube a liquid seal which will prevent the gas in one or both of the bulbs from rising into the base of the U-tube during resetting.

Figure 4:
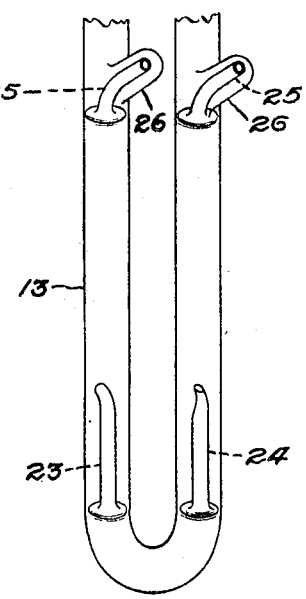
Figure 5:
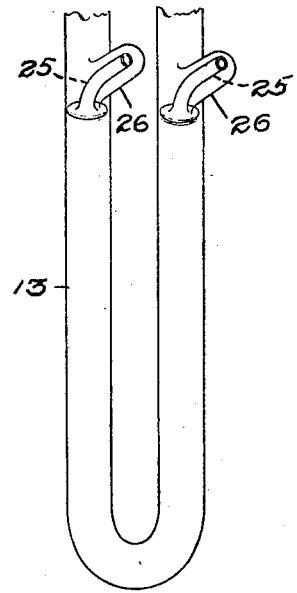
Figure 6:
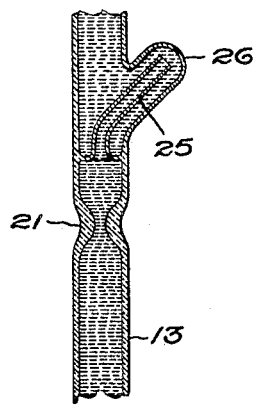

The details of construction and mode of operation of my improved instrument will be better understood from the following description when taken in connection with the drawings which form a part of this application and in which Fig. 1 is an elevation of an instrument in which my invention is embodied, the cover of the instrument being removed in order to show the working parts; Fig. 2 is a back elevation of the tube showing the preferred form of my invention; Figs. 3, 4 and 5 are back views of portions of tubes showing modified forms thereof; and Fig. 6 is a sectional elevation of a portion of a tube showing the liquid seal and constriction.

In Fig. 1 the casing in which the working parts of the instrument are contained is indicated at 1. The cover, which is not shown, is hinged to the lower end of this casing and is of the same general form. A pane of glass set in the cover allows the scale of the instrument to be seen when the cover is closed. Mounted in the inside of the casing is a block of insulating material 2 to which are attached the terminals 3 and 4. The ends of the wires 5 and 6, which carry the current to and form the indicator, pass through insulated bushings 7 in the sides of the casing and are held in holes in the terminals 3 and 4 by means of the screws 8, as is clearly shown in Fig. 1. Pivotally connected with the terminals 3 and 4 are the members 9 and 10 which serve both as conductors, as will be hereafter explained, and as hinge members for connecting the supporting base 11 with the casing of the instrument. This base 11, which may be made of wood or some other non-conducting material, is connected to the members 9 and 10 by means of screws, as is clearly shown.

The glass tube, which is mounted upon the back 11, is held thereon by the strap 12, as shown in Fig. 1, or in any other suitable manner. This tube is more clearly shown in Fig. 2 and consists in general of a U-shaped tube 13 provided at one end with the bulb 14 and at the other end with the bulb 15, a gage tube 16 being attached to the U-tube at a point slightly below the bulb 15. This U-tube is filled with a suitable liquid to the levels indicated in Figs. 1 and 2. Surrounding the bulb 14 is a thin heating strip 17 of some suitable material electrically connected with the members 9 and 10 by the conductors 18 and 19, as shown in Fig. 1. It is obvious, therefore, that current may flow from one of the terminals 3 or 4 through one of the hinge members, the heating strip, and the other hinge member to the other terminal. In this way the bulb 14 is heated by the current passing through the instrument. The heating of the bulb 14 causes an expansion of the gas therein, thereby forcing some of the liquid in that arm of the U-tube over into the other arm thereof out of which part of it overflows into the gage tube 16 in the manner well understood. A plate 20, on which is engraved a suitable scale, is supported behind the gage tube, as shown in Fig. 1, and the height to which the liquid rises in the gage tube gives a reading on the scale of the maximum current which has passed through the instrument.

The constrictions whose function, as above explained, is to hold back the main body of the liquid when the tube is inverted during resetting or while being shipped, are shown at 21 and 22. These are easily formed by drawing down the tube at these points.

The gas traps which have been mentioned as being for the purpose of catching any bubbles of gas that may pass by the constrictions when the tube is inverted, are shown in Fig. 2 as consisting of the small tubes 23 and 24 sealed into the U-tube near its base. By these traps any bubbles that may pass the constrictions are held on the side of the U-tube on which they belong and their return to their respective bulbs is assured. While these constrictions and gas traps serve to keep gas in one bulb from passing over to the other bulb, yet, as explained above, tubes which contain these alone are open to certain objections. It is to overcome these that I insert in the tube my so-called liquid seal. The construction of this liquid seal will be understood from Figs. 2 and 6. It consists of the small bent tube 25 which is sealed into the U-tube and has its end extending outward into a branch tube 26. The branch tube 26 extends from what is the back side of the U-tube when this is mounted in the casing. It will, therefore, be seen that when the base 11 carrying the tube is tilted upward in order to allow the liquid in the gage tube to drain back into the bulb 15, the branch tube 26 will always be on the under side of the U-tube and will, therefore, remain filled with liquid. This liquid in the branch tube 26 will cover the end of the bent tube 25, thereby preventing any gas from passing upward from the bulb 15 beyond this point while the tube is inverted. While current is passing through the instrument or shortly after current has passed through it, it may happen that there is a lack of pressure in the bulb 14 and a resulting tendency for the liquid in the arm of the U-tube which carries the bulb 15 to pass over to the other arm of the tube. If this condition exists while the tube is inverted, the liquid in the branch tube 26 may be sucked upward through the bent tube 25. It is important therefore that the tube 25 should be made so small and the branch tube 26 of such capacity that there is no chance of the branch tube being drained and the end of the bent tube uncovered while the tube is inverted. It has been found by experiment that parts proportioned as shown in the drawings fulfil the requirements.

Fig. 3 shows a modified form of tube which may be used in the place of the tube shown in Fig. 2. The only difference between the tube shown in Fig. 3 and that shown in Fig. 2 is that in the former a liquid seal is used on the expansion side as well as on the compression side of the U-tube. In other words, two gas traps, two constrictions, and two liquid seals are used. The effect of using a liquid seal on the expansion side of the tube is simply the preventing of bubbles of gas from passing the constriction on this side during resetting of the instrument. As I have found by actual experiment that it does no harm if bubbles do pass the constriction on the expansion side of the tube, the use of a liquid seal to prevent this is a refinement that is for most practical purposes unnecessary.

Fig. 4 shows another form of tube that will give satisfaction. In this tube the constrictions shown in Figs. 2 and 3 are omitted, the liquid seals being depended upon to perform the function of the constrictions as well as their own regular function. By making the bore of the small bent tubes in these liquid seals small, the effect is obviously the same as that produced by constrictions in the U-tube itself. Tubes 3 and 4 are, therefore, just as satisfactory as the form of tube shown in Fig. 2, and the latter form is only preferred out of consideration for ease in manufacture.

In the form of tube shown in Fig. 5, no gas traps or constrictions are used and a liquid seal in each arm of the U-tube is relied upon to keep the gas in each side of the tube in its respective bulb. The small bent tubes in the liquid seals in this tube should be made with a small bore for the same reason as in the tube shown in Fig. 4; namely, in order that they may fulfil the function of the constrictions as well as their own particular function. An indicator having a tube of this kind is perfectly satisfactory if care is taken to keep the indicator in such a position that the branch tubes of the liquid seals are always filled. It is obvious, however, that if this instrument in shipment is laid in a horizontal position with its face down, the branch tubes of the liquid seals will be drained and the ends of the small bent tubes in the seals exposed to the gas within the bulbs. In this condition it might be possible for the gas to work by the seals and into the bottom of the U-tube, and as there are no gas traps to keep the bubbles from the two sides of the tube separate, they would probably mingle together and would not return to their respective bulbs. This would, of course, upset the calibration of the instrument. If, however, an instrument having a tube of this kind is always maintained in an upright position after it has been calibrated, it will operate in a perfectly satisfactory manner.

While I have described several forms in which my invention may be embodied, I wish it distinctly understood that I recognize that these may be modified in many ways without departing from the spirit of my invention. For instance, a tube having a liquid seal and a gas trap in the compression side thereof and a constriction and an air trap in the expansion side would operate satisfactorily. All such modifications I intend to cover by the following claims.

What I claim as new, and desire to secure by Letters Patent of the United States, is,—

1. In a maximum demand indicator, a main tube containing a liquid and terminating at each end in a bulb, a current-carrying conductor located adjacent one of said bulbs, a gage tube connected with the main tube, and a liquid seal in the main tube for preventing the gas in a bulb from passing into the main tube.

2. In a maximum demand indicator, a main tube containing a liquid and terminating at each end in a bulb, a current-carrying conductor located adjacent one of said bulbs, a gage tube connected with said main tube, a gas trap in said main tube, and a liquid seal in said main tube for preventing the gas in a bulb from passing into the main tube.

3. In a maximum demand indicator, a main tube containing a liquid and having constrictions therein and terminating at each end in a bulb, a current-carrying conductor located adjacent one of said bulbs, a gage tube connected with said main tube, and a liquid seal in the main tube for preventing the gas in a bulb from passing into the main tube.

4. In a maximum demand indicator, a main tube containing a liquid and having constrictions therein and terminating at each end in a bulb, a current-carrying conductor located adjacent one of said bulbs, a gage tube connected with said main tube, a gas trap in said main tube, and a liquid seal in the main tube for preventing the gas in a bulb from passing into the main tube.

5. In a maximum demand indicator, a U-shaped tube containing a liquid and terminating at each end in a bulb, a current-carrying conductor located adjacent one of said bulbs, a gage tube connected with one arm of the U-tube, and a liquid seal in the U-tube for preventing the gas in one bulb from passing into the U-tube.

6. In a maximum demand indicator, a U-shaped tube containing a liquid and terminating at each end in a bulb, a current-carrying conductor located adjacent one of said bulbs, a gage tube connected with one arm of the U-tube, and a liquid seal in the U-tube on the compression side thereof for preventing the gas on that side from passing into the U-tube.

7. In a maximum demand indicator, a U- shaped tube containing a liquid and terminating at each end in a bulb, a current-carrying conductor located adjacent one of said bulbs, a gage tube connected with one arm of the U-tube, a gas trap in said U-tube, and a liquid seal in said U-tube for preventing the gas in one bulb from passing into the U-tube.

8. In a maximum demand indicator, a U-shaped tube containing a liquid and terminating at each end in a bulb, a current-carrying conductor located adjacent one of said bulbs, a gage tube connected with one arm of the U-tube, a gas trap in each arm of said U-tube, and a liquid seal in the U-tube for preventing the gas in one bulb from passing into the U-tube.

9. In a maximum demand indicator, a U-shaped tube containing a liquid and terminating at each end in a bulb, a current-carrying conductor located adjacent one of said bulbs, a gage tube connected with one arm of the U-tube, a gas trap in each arm of said U-tube, and a liquid seal in the arm of the U-tube on the compression side thereof for preventing the gas on that side from passing into the U-tube.

10. In a maximum demand indicator, a U-shaped tube containing a liquid and having constrictions therein and terminating at each end in a bulb, a current-carrying conductor located adjacent one of said bulbs, a gage tube connected with one arm of the U-tube, and a liquid seal in the U-tube for preventing the gas in one bulb from passing into the U-tube.

11. In a maximum demand indicator, a U-shaped tube containing a liquid and having constrictions therein and terminating at each end in a bulb, a current-carrying conductor located adjacent to one of said bulbs, a gage tube connected with one arm of the U-tube, a gas trap in each arm of said U-tube, and a liquid seal in the U-tube for preventing the gas in one bulb from passing into the U-tube.

12. In a maximum demand indicator, a U-shaped tube containing a liquid and having a constriction in each arm thereof and terminating at each end in a bulb, a current-carrying conductor located adjacent one of said bulbs, a gage tube connected with one arm of the U-tube, a gas trap in each arm of said U-tube, and a liquid seal in the U-tube for preventing the gas in one bulb from passing into the U-tube.

13. In a maximum demand indicator, a U-shaped tube containing a liquid and having constrictions therein and terminating at each end in a bulb, a current-carrying conductor located adjacent one of said bulbs, a gage tube connected with one arm of the U-tube, and a liquid seal located in the arm of the U-tube on the compression side thereof for preventing the gas in the compression bulb from passing into the U-tube.

14. In a maximum demand indicator, a U-shaped tube containing a liquid and having constrictions therein and terminating at each end in a bulb, a current-carrying conductor located adjacent one of said bulbs, a gage tube connected with one arm of the U-tube, a gas trap in each arm of said U-tube, and a liquid seal in the arm of the U-tube on the compression side thereof for preventing the gas in the compression bulb from passing into the U-tube.

15. In a maximum demand indicator, a U-shaped tube containing a liquid and having constrictions therein and terminating at each end in a bulb, a current-carrying conductor located adjacent one of said bulbs, a gage tube connected with one arm of the U-tube, a gas trap in each arm of said U-tube, and a liquid seal located above the constricted portion in the arm of the U-tube on the compression side thereof for preventing the gas in the compression bulb from passing into the U-tube.

16. In a maximum demand indicator, a U-shaped tube having a bore of alternate large and small diameter and terminating at each end in a bulb and containing a liquid, a current-carrying conductor located adjacent one of said bulbs, a gage tube connected with one arm of said U-tube, and a liquid seal in the U-tube for preventing the gas in one bulb from passing into the U-tube.

17. In a maximum demand indicator, a U-shaped tube having a bore of alternate large and small diameter and terminating at each end in a bulb and containing a liquid, a current-carrying conductor located adjacent one of said bulbs, a gage tube connected with one arm of said U-tube, and a liquid seal in the U-tube on the compression side thereof for preventing the gas in the compression bulb from passing into the U-tube.

18. In a maximum demand indicator, a U-shaped tube having a bore of alternate large and small diameter and terminating at each end in a bulb and containing a liquid, a current-carrying conductor located adjacent one of said bulbs, a gage tube connected with one arm of said U-tube, a gas trap in said U-tube, and a liquid seal for preventing the gas in one bulb from passing into the U-tube.

19. In a maximum demand indicator, a U-shaped tube having a bore of alternate large and small diameter and terminating at each end in a bulb and containing a liquid, a current-carrying conductor located adjacent one of said bulbs, a gage tube connected with one arm of said U-tube, a gas trap in each arm of said U-tube, and a liquid seal in said U-tube for preventing the gas in one bulb from passing into the U-tube.

20. In a maximum demand indicator, a U-shaped tube having a bore of alternate large and small diameter and terminating at each end in a bulb and containing a liquid, a current-carrying conductor located adjacent one of said bulbs, a gage tube connected with one arm of said U-tube, a gas trap in each arm of said U-tube, and a liquid seal in the arm of the U-tube on the compression side thereof for preventing the gas in the compression bulb from passing into the U-tube.

In witness whereof, I have hereunto set my hand this ninth day of November, 1906.

FRANCIS H. BOWMAN.

Witnesses:
H. H. BARNES, Jr.,
A. H. ABELL.